United States Patent [19]

Grossbach et al.

[11] 4,025,104

[45] May 24, 1977

[54] SLIDING DOOR FOR VEHICLES, ESPECIALLY AUTOMOBILES

[75] Inventors: Alfred Grossbach, Tamm; Ralf Mertin, Sprockhovel, both of Germany

[73] Assignee: Lunke & Sohn GmbH, Witten (Ruhr), Germany

[22] Filed: Sept. 9, 1975

[21] Appl. No.: 611,808

[30] Foreign Application Priority Data

Sept. 11, 1974 Germany .......................... 2443472

[52] U.S. Cl. ................................. 296/155; 49/345; 49/414

[51] Int. Cl.[2] ........................................... B60J 5/06

[58] Field of Search ............. 296/155; 49/339, 345, 49/404, 405, 414

[56] References Cited

UNITED STATES PATENTS 3,708,192 1/1973 Klebba .............................. 296/155

FOREIGN PATENTS OR APPLICATIONS 2,119,209 11/1971 Germany .......................... 296/155
1,255,516 11/1962 Germany .......................... 296/155
2,025,406 5/1970 Germany .......................... 296/155

*Primary Examiner*—Joseph F. Peters, Jr.
*Assistant Examiner*—John A. Carroll
*Attorney, Agent, or Firm*—Toren, McGeady and Stanger

[57] ABSTRACT

A tilting lever is mounted between a pivotal guide head and one side of a sliding door for a vehicle. The tilting lever is made of two angularly spaced arms with abutment surfaces at one end. The abutment surfaces engage with abutment surfaces and cam surfaces on the guide head and sliding door so as to hold the tilting lever in one of two positions. In one position the guide head is prevented from pivoting, while in the other position the sliding door is prevented from sliding. The guide head and sliding door are mounted together on a supporting arm pivoted to the body of the vehicle whereby the sliding door is first moved to an intermediate position and then to an open position.

6 Claims, 3 Drawing Figures

SLIDING DOOR FOR VEHICLES, ESPECIALLY AUTOMOBILES

BACKGROUND OF THE INVENTION

This invention relates to a sliding door for vehicles, especially automobiles, which is longitudinally and slidably guided, by means of a horizontally oriented guide bar extending along the length of the door, in a guide head, pivotally journalled about a vertical axis on a supporting arm itself pivotally mounted about a parallel axis on the vehicle body, whereby the sliding door, with alternate locking of the sliding movement and of the pivot bearing of its supporting device, is initially displaceable into an intermediate position parallel to its closed position and subsequently displaceable longitudinally of the vehicle.

For the correct functioning of such a sliding door for automobiles, it is essential that the door body, in its swung-in, closed position flush with the side wall of the vehicle body, and during the outward swinging of the door into its intermediate position parallel to this closed position, and also especially during the swinging-in from its intermediate position into its closed position, shall be locked to the guide head of the supporting device to prevent any longitudinal sliding, whereas on the other hand, during the sliding of the door longitudinally of the vehicle, the supporting device, especially the guide head, must be secured against an unintentional pivoting movement. For this purpose, provision was made in an earlier proposal, that the supporting device and especially its guide head, in its swung-out position, be automatically locked in the dead-centre position, secured by means of a tension spring attached to the vehicle body, of the supporting arm carrying the guide head and of a rod and associated with the control of the pivoting movement of the guide head. This arrangement has however proved to be complicated and cumbersome and in particular does not permit a uniformly easy-running movement of the door body into its closed position, since the overcoming of the dead-centre position of the supporting device necessitates a considerable expenditure of force which, if the closure movement of the sliding door is slow, cannot be completely overcome by the inertia of the forward moving door.

SUMMARY OF THE INVENTION

The problem underlying this invention is, therefore, for a sliding door of the type initially described, to create a simple and functionally reliable locking device, which with alternate locking of the sliding movement of the door body and of the pivoting movement of its supporting device, permits initially an outward movement of the door body into an intermediate position parallel to its closed position while the sliding movement is blocked, and subsequently an easy-running displacement of the door body longitudinally of the vehicle, the pivoting bearing of its supporting device being blocked.

This problem is solved according to this invention substantially in that there are associated with a tilting lever mounted pivotally on the guide head about an axis parallel to its pivot bearing, abutments disposed partly on the sliding door and partly on the pivot bearing of the guide head and blocking firstly the longitudinal mobility of the guide bar in the guide head and secondly the pivotal freedom of this head relative to the supporting arm, and furthermore cam surfaces which constrain the switching over of the tilting lever as a function of the pivot position of the supporting device and the direction of movement of the door body. The tilting lever may here favourably be journalled eccentrically on the guide head and comprise lever arms oriented at an angle to each other, the mutual angular setting of which is so designed in relation to the arrangement of the tilting lever pivot bearing, that its one lever arm is oriented tangentially to the pivot bearing of the guide head. Associated with the tilting lever are firstly a cam segment partially surrounding the pivot bearing of the guide head and having a cam surface coaxial to the pivot axis of the guide head and abutment surfaces oriented radially to the pivot axis of the guide head, and secondly an abutment surface oriented at an acute angle to the axis of the guide bar, mounted on the end fixing plate of the guide bar, and acting as a barrier surface. In the engagement with either the abutment surface on the pivot bearing of the guide head or with the abutment surface on the guide bar fixing plate, the tilting lever is here secured by means of a tension spring engaging its one lever arm and oriented diagonally to the basic surface of the guide head and attached to the guide head. In detail, that lever arm of the tilting lever which co-operates with the cam segment on the pivot bearing of the guide head is furnished at its end with an abutment surface oriented substantially radially to the pivot axis of the guide head and with an inclined surface adjoining this radial surface and ascending obliquely longitudinally of the lever arm, whereby this lever arm by co-operation of its abutment surface with the abutment surface of the cam segment, blocks the freedom to pivot of the guide head relative to the supporting arm, and secondly by co-operation of its wedge-shaped ascending inclined surfce with the circumferential surface of the same segment, ensures the engagement of the other arm of the tilting lever with the abutment surface associated therewith on the guide bar fixing plate. The other tilting lever arm, cooperating with the door by means of an abutment surface disposed on the guide bar fixing plate, possesses at its free end an inclined nose having an arc-shaped rear surface and engages with the internal surface of its nose the abutment surface associated with it. A cam surface likewise mounted on the guide bar fixing plate and oriented parallel to the abutment surface is associated with the arc-shaped rear surface of the tilting lever nose, the clear distance between the abutment and cam surfaces being equal to the width of the tilting lever nose.

According to the invention, the tilting lever may be secured against deflection out of its plane of movement by means of a set screw engaging into a slit-shaped recess of its lever arm coaxial with its pivot bearing. Having regard to the fact that the pivot bearing of the guide head and the connection between the guide bar and the door body cannot usually be disposed in a common plane, provision is furthermore made according to the invention for the two tilting lever arms to be disposed in differing, superimposed planes, which may favourably be achieved by a basically Z-shaped form of the tilting lever.

The cam segment associated with the pivot bearing of the guide head is advantageously formed of a substantially triangular cut-out piece of flat material, the base of this triangle being curved to suit the circumference of the pivot bearing and terminated as an upward-facing collar. The door-side abutment associated with the other tilting lever arm is, according to the invention, constructed together with its cam and abutment surfaces of a singlepiece, repeatedly bent, strip-shaped cut-out of flat material, and attached especially by welding to the end fixing plate of the guide bar.

BRIEF DESCRIPTION OF THE DRAWING

The invention is described in the following description of an example relating to the embodiment illustrated in the drawing, wherein.

DETAILED DESCRIPTION OF THE INVENTION

Figure 1:
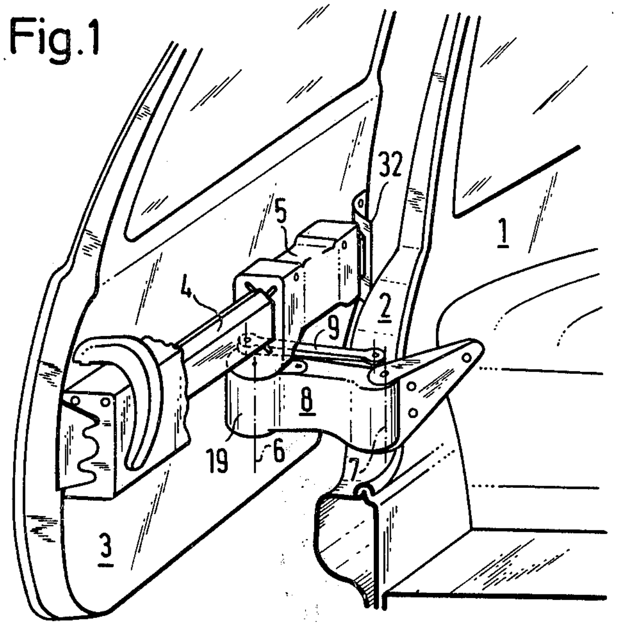
FIG. 1 is a prespective view of the supporting device of a sliding door, constructed according to this invention, for vehicles.
Figure 3:
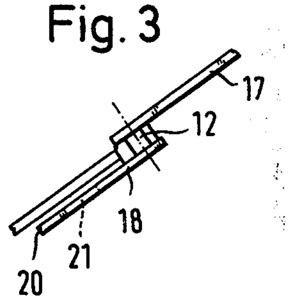
FIG. 3 is a partially cut away lateral view of the tilting lever used in the suspension according to FIGS. 1 and 2.

In a vehicle body 1, a door opening 2 is provided, which can be closed by means of a sliding door 3. The sliding door 3 is longitudinally guided in a guide head 5 by means of a horizontally oriented guide bar 4 extending over the length of the door, which guide head is pivotally journalled about a first vertical axis 6 on a supporting arm 8 itself pivotally mounted about a parallel second vertical axis 7 on the vehicle body 1. With the control of the outward movement of the sliding door 3 into an intermediate position parallel to its closed position, there is associated a rod 9, which is pivotally attached, on the one hand about an axis 10 parallel to the axis 7 to the vehicle body 1 and secondly about an axis 12 parallel to the pivotal axis 6 of the guide head 5 to the guide head 5. The alternate locking of the supporting device of the sliding door in such a manner that the door body, during the outward movement from its closed position into its parallel intermediate position and conversely during the swinging-in from its parallel intermediate position into the closed position, shall be locked by the guide head 5 against a sliding movement, and that secondly, when the door body 3 is fully swung out into the intermediate position, the guide head 5 shall by securely locked against a pivotal motion relative to the supporting arm 8 about its pivoting axis 6, is effected by a locking device, which basically comprises a tilting lever 13 mounted on the guide head 5 pivotally about the axis 12 parallel to the pivot axis 6 of the guide head 5, and a cam segment 14 associated with this, and also gripping means in the form of a clamping member or an abutment surface 15 disposed on the side of the door and a cam surface 16 likewise mounted on the side of the door. The tilting lever 13 possesses two lever arms 17 and 18, oriented at an angle to each other, whereby as can be seen especially from the representation in FIG. 3, the two lever arms 17 and 18 of the otherwise single-part tilting lever 13, are disposed in two different planes lying above another. The lever arm 18 of the tilting lever 13 possesses an inclined nose 26 at a first end thereof and, at its second end, an abutment surface 20 oriented substantially radially to the pivot bearing 19 for the guide head 5, and adjoining this longitudinally and ascending obliquely towards its pivot axis 12, an inclined cam follower surface 21. By means of its abutment surface 20, the lever arm 18 co-operates with an abutment surface 22, of the cam segment 14, oriented correspondingly radially to the pivot bearing 19 for the guide head 5, while it co-operates by means of its inclined surface 21 with the cam surface 23, of the cam segment 14, parallel to the circumference of the pivot bearing 19. The cam segment 14 is constituted of a basically triangular flat sheet cut-out, whereby the arc-shaped base of the triangular cut-out is bent upwards to a collar surrounding the pivot bearing 19. The cam segment 14 is secured over its remaining area constituting a fixing flange 24, by means of a threaded pin 25, to the supporting arm 8. The other lever arm 17 of the tilting lever 13 possesses, at its end, an inclined nose 26, which co-operates by means of an arc-shaped rear surface 27 with the cam surface 16 and by means of a rectilinear internal surface 28 with the abutment surface 15. In their engagement with the associated abutment surfaces 22, 15 respectively, the abutment surfaces 20, 28 respectively of the tilting lever 13 are positively retained by the cam surfaces 23, 16 respectively. The engaging of the abutment surfaces 20, 28 respectively of the tilting lever 13 on the abutment surfaces 22, 15 respectively is secured by a restoring tension spring 29, which is oriented basically diagonally to the basic surface of the guide head 5, and is secured to this at 30 and engages at 31 on the lever arm 17 of the tilting lever 13. The door-side abutment surface 15 oriented obliquely to the axis of the guide bar 4, and also the cam surface 16 oriented parallel to it, receive between them, almost without clearance, the nose 26 of the tilting lever arm 17, and are formed in one piece of an inclined support 32, welded onto the door body 3. In order to prevent deflection of the tilting lever 13 out from its designed plane of movement, a set screw 33 is provided, which engages into a recess 34, of the tilting lever arm 17, curved coaxially to the tilting lever pivot axis 12.

Figure 2:
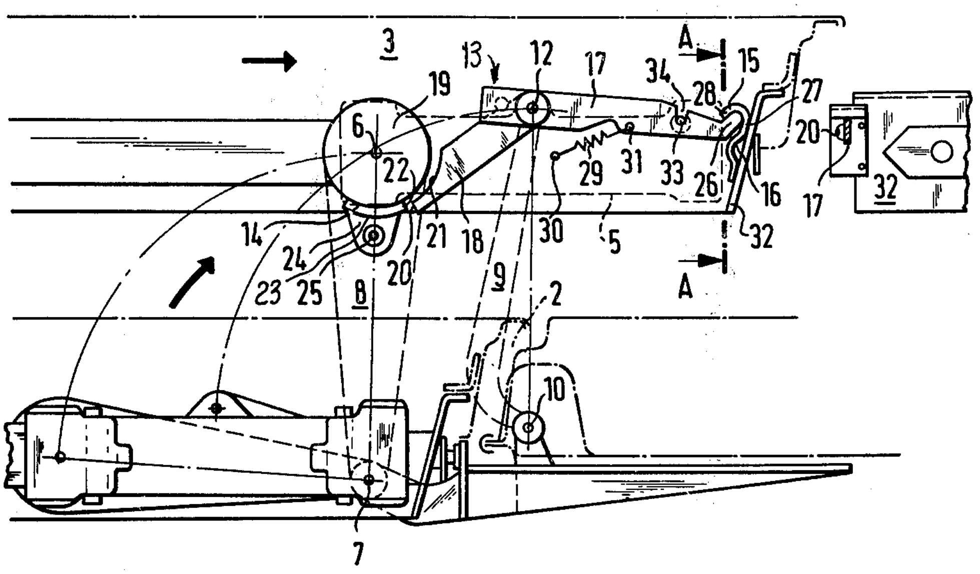
FIG. 2 is a plan view of the sliding door suspension according to FIG. 1.

When the door body is in its closed position, the nose 26 of the tilting lever arm 17 engages, in the position of the tilting lever illustrated in FIG. 2, between the abutment surface 15 and the cam surface 16 at the end support 32 of the guide bar 4, and is secured in this position by the inclined surface 21, of the other tilting lever arm 18, which bears against the cam surface 23. This positively retained engagement position of the tilting lever 13 is maintained by the length of the cam surface 23 during the entire outward movement of the door body 3 into its parallel intermediate position. Only when the door body 3 has swung fully out into its parallel intermediate position, does the tilting lever arm 18 of the tilting lever 13 become released from the cam surface 23 of the segment 14, and engages under the action of the restoring spring 29 with its abutment surface 20 into the abutment surface 22 of the cam segment 14, so that now the freedom to pivot of the guide head 5 relative to the supporting arm 8 about its pivoting axis 6 is blocked. At the same time, the tilting motion of the tilting lever 13, caused by the engagment of the barrier surface 20 of the one tilting lever arm 18, causes a disengagement of the nose 26 provided at its other lever arm 17 from the gripper means or abutment surface 15, so that now the sliding movement of the guide bar 4 relative to the guide head 5 is unblocked, and thereby the door body 3 becomes slidable longitudinally of the vehicle. When closing the sliding door 3, when the region of the front end positon of the door body 3 is reached, the cam surface 16 comes into abutment against the arc-shaped rear surface 27 of the nose 26 of the tilting lever arm 17, and now causes a reversed tilting motion of the tilting lever 13 in such a manner that the nose 26 of the tilting lever arm 17 runs with its inner surface into the abutment surface 15 and at the same time, as a result of the tilting motion of the tilting lever 13 caused thereby, the abutment surface 20 of the other tilting lever arm 18 comes out of engagement with the abutment surface 22 of the cam segment 14. Thus the longitudinal sliding motion of the guide bar 4 in the guide head 5 is blocked and the door body 3 is locked to the guide head 5. With a further movement of the door body 3 in the direction of closure, the lever arm 18 of the tilting lever 13 now comes into abutment with its inclined surface 21 upon the cam surface 23 of the cam segment 14, so that the engagement of the abutment surface 28 of the nose 26 of the tilting lever with the abutment surface 15 of the end fixing of the guide bar 4 is positively locked. This lever position is maintained, as a result of the shape of the cam surface 23 of the cam segment 14, until the sliding door 3 has travelled into its closed position and has been swung out of its again into its intermediate position parallel to its closed position.

We claim:

1. A sliding door assembly for vehicles comprising:
- a longitudinally slidable door;
- a guide bar mounted on said door and extending along the length thereof;
- a guide head slidably engaging said guide bar for slidably supporting said door;
- a supporting arm assembly having said guide head pivotally mounted thereon about a first vertical axis and extending for pivotal mounting engagement with a vehicle body about a second vertical axis parallel with said first vertical axis, and supporting arm assembly in cooperation with said guide head and guide bar operating to guide displacement of said door between a closed position and an intermediate position by pivotal motion of said door about said first axis, and between said intermediate position and an open position by sliding motion of said door guide bar relative to said guide head;
- tilting lever means having a first and a second end and pivotally mounted upon said guide head at a point intermediate said ends;
- gripper means fixed relative to said door for releaseably gripping said first end of said tilting lever means to prevent relative sliding motion between said guide head and said guide bar;
- spring means engaging said tilting lever means and pivotally biasing said first end of said tilting lever means out of engagement with said gripping means; and
- cam means arranged on said guide head for engagement with said second end of said tilting lever means to block pivotal motion of said first end of said tilting lever means out of engagement of said gripper means during pviotal motion of said door between said closed position and said intermediate position, and to prevent pivotal motion of said door about said first vertial axis during sliding movement of said door between said intermediate position and said open position;
- said cam means operating to stop blocking pivotal motion of said first end out of engagement with said gripper means after said door has reached said intermediate position thereby enabling said spring means to being said first end out of engagement with said gripper means.

2. An assembly according to claim 1 wherein movement of said door from said open position to said intermediate position operates to cause said gripper means to be brought into engagement with said first end of said tilting lever means with consequent pivotal motion of said tilting lever means to bring said second end thereof into engagement with said cam means in a position wherein said cam means operates to block pivotal motion of said tilting lever means in a direction tending to disengage said first end from said gripper means.

3. An assembly according to claim 1 wherein said tilting lever means comprises a first arm having said first end defined thereon and a second arm having said second end defined thereon, said first and second arms lying in parallel spaced planes and each extending from said intermediate pivotal mounting of said tilting lever means at an oblique angle relative to each other.

4. An assembly according to claim 3 wherein said guide head is pivotally mounted upon said supporting arm assembly by a pivot bearing and wherein said second arm of said tilting lever means is directed to extend generally tangentially to said pivot bearing, said cam means comprising a generally arcuate member extending concentrically about said first vertical axis and said pivot bearing, said generally arcuate member includng an abutment end surface, said second end of said tilting lever being formed with an arcuate follower surface engaging about said arcuate member when said tilting lever means is in position to block disengagement of said first end from said gripping means, and with an abutment end which abuts said abutment end surface of said arcuate member to prevent pivotal movement of said door.

5. An assembly according to claim 1 wherein said first end of said tilting lever means comprises an inclined nose and wherein said gripper means comprise a clamping member adapted to clamp said nose therein, said clamping member being formed with a cam surface which engages said inclined nose to effect pivotal motion of said tilting lever means so that said cam means becomes engaged with said second end to block pivotal motion of said tilting lever means in a direction tending to disengage said inclined nose from said clamping member while said door means is moved between said closed and said intermediate position.

6. An assembly according to claim 1 wherein said tilting lever means is mounted for pivotal motion at a point intermediate its ends about an axis extending generally parallel to said first and said second vertical axes.

* * * * *